United States Patent [19]
Miller et al.

[11] Patent Number: 5,796,735
[45] Date of Patent: Aug. 18, 1998

[54] SYSTEM AND METHOD FOR TRANSMISSION RATE CONTROL IN A SEGMENTATION AND REASSEMBLY (SAR) CIRCUIT UNDER ATM PROTOCOL

[75] Inventors: Michael J. Miller, Saratoga; Bilal Murtaza, Newark; Chih-Ping Sun, San Jose, all of Calif.

[73] Assignee: Integrated Device Technology, Inc., Santa Clara, Calif.

[21] Appl. No.: 520,285

[22] Filed: Aug. 28, 1995

[51] Int. Cl.[6] .............................. H04L 12/28; H04L 12/56
[52] U.S. Cl. ..................... 370/395; 370/474; 371/5.5; 395/200.2; 395/200.13
[58] Field of Search ........................... 370/395, 399, 370/412, 474, 397, 253, 394, 468, 471, 232; 395/200.13, 200.2; 371/5.5

[56] References Cited

U.S. PATENT DOCUMENTS

| 5,414,702 | 5/1995 | Kudoh | 370/395 |
| 5,602,853 | 2/1997 | Ben-Michael et al. | 370/474 |
| 5,625,625 | 4/1997 | Oskouy et al. | 370/395 |

OTHER PUBLICATIONS

IDT77201 "155 Mbps ATM SAR Controller for PCI-based Networking Applications" Data Sheet, Integrated Device Technology, Inc, 1996.
Bt8230 "ATM Segmentation and Reassembly Controller—ATM SAR" Data Sheet, Brooktree Corp., Mar. 1995.

Primary Examiner—Wellington Chin
Assistant Examiner—Melissa Kay Carman
Attorney, Agent, or Firm—Skjerven, Morrill, MacPherson, Franklin & Friel

[57] ABSTRACT

A segmentation and reassembly circuit under the ATM standard uses a transmit cell schedule table (TCST) to support real time transmission of ATM cells in multiple constant bit rate virtual channels. In one embodiment, null cells are intentionally scheduled in a TCST. Transmission of the scheduled null cells ("forced null cells") or non-time critical cells are skipped to compensate for delays in an ATM cell transmission schedule, e.g. delays due to a bus latency. During such latency, null cells are generated from a null cell generator and a negative credit counter is incremented for each ATM cell transmission time missed. When transmission of a forced null cell is skipped, the negative credit counter is decremented.

29 Claims, 9 Drawing Sheets

SYSTEM AND METHOD FOR TRANSMISSION RATE CONTROL IN A SEGMENTATION AND REASSEMBLY (SAR) CIRCUIT UNDER ATM PROTOCOL

BACKGROUND OF THE INVENTION

1. Field of the Invention

This invention relates to telecommunication systems and, in particular, relates to integrated circuits for telecommunication and systems using such integrated circuits.

2. Discussion of the Related Art

Asynchronous transfer mode (ATM) is an outgrowth of the BISDN (Broadband Integrated Services Digital Network) standard. The ATM standard is suitable for use in high speed digital communication carried in such media as synchronous optical networks. A detailed discussion of the ATM standard can be found in "Asynchronous Transfer Mode: Bandwidth for the Future," published by Telco Systems. Under the ATM standard, the basic unit for carrying the data traffic is a 53-byte long fixed-length packet, called an "ATM cell". Each ATM cell consists of a 5-byte header, which is an overhead portion used for identification and routing, and a 48-byte information field (the "ATM payload"), which is used for carrying the data.

The ATM standard can be seen as a protocol stack consisting primarily of three layers: (a) the physical layer; (b) the ATM layer; and (c) the ATM adaptation layer (AAL). The physical layer interfaces with the transmission medium, and controls media-dependent parameters, such as framing and data rates. Typically, traffic between application level processes are routed through many nodes of a computer network. The ATM layer is used for communication between adjacent network nodes, i.e. the ATM layer operates only on a link-to-link basis. The AAL interfaces with higher level protocols, and provides the end-to-end processing. Thus, the AAL controls the end-points of an ATM communication, and inserts and removes data from the ATM layer.

ATM uses the concepts of "virtual paths" (VP) and "virtual channels" (VC) to allow routing of ATM packets between adjacent communicating ATM layers. A VC is a logical connection between two communicating ATM entities. Once created, a VC carries all communication between the communication entities for which it is created, with cell sequence preserved. Multiple VCs between the same two communicating entities can be grouped into a VP for routing purpose. FIG. 1 shows the format of an ATM cell's 5-byte buffer.

As shown in FIG. 1, the first four bits of an ATM cell, indicated in FIG. 1 by reference numeral 101, is a 4-bit generic flow control (GFC) field. The next byte, indicated by reference numerals 102a and 102b, is a virtual path identifier (VPI) identifying the virtual path of the ATM cell's virtual circuit. Following the VPI byte is a 2-byte virtual channel identifier (VCI), indicated by reference numerals 103a, 103b and 103c, which identifies the ATM cell's virtual circuit. The next four bits in the 5-byte header consist of a 3-bit payload type (PT), which identifies the type of information carried by the cell, and a 1-bit "cell lost priority" (CLP) flag, which indicates whether the cell can be discarded under congested traffic condition. The PT and CLP fields are indicated in FIG. 1 by reference numerals 104 and 105 respectively. The final byte is an 8-bit header error control (HEC) field, indicated by reference numeral 106. The HEC field is computed so as to allow error correction in the preceding four bytes.

Under the current ATM standard, five types of AAL are defined. Type 1 AAL is defined for a constant bit rate (CBR) service; types 2-5 AALs are defined for variable bit rate (VBR) services. In addition, to increase efficiency, AAL type 5 ATM cells do not provide error correction or detection capabilities at the ATM level. Rather, AAL type 5 ATM cells depend on higher level processes to provide such error detection or recovery. In addition, ATM cells carrying control information ("OAM cells"), i.e. cells carrying system level or resource management messages and not data to be reassembled, are also provided.

An AAL can be viewed as consisting of two sublayers: the convergence sublayer (CS) and the segmentation and reassembly (SAR) sublayers. At the transmission end, the convergence sublayer divides a higher level data block of indefinite length into the payloads of variable length data units, called the "convergence sublayer protocol data units" (CS-PDUs)[1]. Each CS-PDU consists of a payload portion provided between a header and a trailer. The header and the trailer of a CS-PDU provide identification, size and error control information to the convergence sublayer at the receiving end. The receiving convergence sublayer reassembles the payloads of CS-PDUs back to the higher level data block. Each AAL defines the formats of its CS-PDUs.

At the transmission end, for AAL types 1-4, the SAR sublayer of the AAL divides a CS-PDU into 44-byte

[1] According to the ATM terminology, an output data block of a layer or sublayer is called a "protocol data unit" (PDU), data segments. If a resulting data segment is less than 44-byte long, zeroes are padded at the end to make a 44-byte data segment. Except for AAL type 5, a 2-byte header and a 2-byte trailer are added to the 44-byte segment to form a SAR-PDU, which is used as the payload of the ATM cell. The 2-byte header of the SAR-PDU provides identification and sequence information. For example, under AAL type 4, this 2-byte header includes (i) a 2-bit type, (ii) a 4-bit sequence number, and (iii) a 10-bit message ID. The 2-byte trailer includes (i) a 6-bit quantity indicating the number of bytes of user information excluding the padded zeroes, and (ii) a 10-bit cyclic redundancy check (CRC) checksum. In AAL type 5, however, the 2-byte header and the 2-byte trailer of AAL types 1-4 are not defined, so that all 48-bytes of the ATM payload can be used for carrying user information. The SAR unit at the receiving end reassembles the 48-byte SAR-PDUs back to the CS-PDU.

At the transmission end, the ATM layer adds a 5-byte header to the SAR-PDU to make an ATM cell, which is then passed on to the physical layer for transmission. The ATM layer at the receiving end reassembles the SAR-PDUs from the ATM cells received.

The physical layer can also be seen as consisting of two sublayers: (a) a transmission convergence (TC) sublayer; and (b) a physical medium dependent (PMD) sublayer. At the transmission end, the TC sublayer receives the ATM cells from the ATM layer and inserts the ATM cells into the transmission frames generated by the TC sublayer. The transmission frames are generated according to the specification of the underlying data service, e.g. SONET, DS3 or DS1. The PMD layer interfaces with the physical transmission medium, and control such physical parameters as wave shapes and electro-optical conversion. At the receiving end, the TC sublayer extracts the ATM cells from the transmission frames.

In ATM transmission, it is important to minimize "cell delay variation" (CDV), which is the difference between the actual arrival time of an ATM cell and its expected arrival time. In the prior art, many scheduling control mechanisms are provided by rate timers and are designed to achieve approximate constant rate service based on the number of cells transmitted per second. Due to round-off errors, these systems often exhibit jitters in the transmission rate, thereby resulting in a large CDV. In addition, such rate timers require the ATM transmission circuit to include an additional time base (e.g. an oscillator) to support the rate timers.

The latency of a computer system's main bus between an ATM segmentation circuit and the main memory can also profoundly affect CDV. This is because, whenever the segmentation circuit accesses the main memory to retrieve an ATM payload, the latency between the time the segmentation circuit requests for the main bus and the time the segmentation circuit actually receive control of the main bus is unpredictable.

SUMMARY OF THE INVENTION

In accordance with the present invention, a system and a method are provided for managing multiple constant bit rate channels for transmitting data packets. One embodiment of the present invention is implemented in an integrated circuit for segmenting and reassembling ATM cells under the Asynchronous Transfer Mode (ATM) communication standard.

The present invention provides a circuit comprising: (a) a memory circuit; (b) a control circuit for maintaining in the memory circuit a transmission table which schedules ATM cell transmission regularly, and (c) sending data packet in accordance with the schedules in the transmission table.

In accordance with the present invention, entries each corresponding to a virtual constant bit rate channel are created in the transmission table. For a given virtual constant bit rate channel, the number of entries in the transmission table for that channel is proportional to the bit rate of the channel. A state machine accesses in sequential order the entries of the transmission table whenever a data packet is sent, and causing a data packet to be transmitted by the transmission circuit for each entry accessed. The transmission circuit sends the state machine a control signal whenever a data packet is actually transmitted.

In one embodiment, each entry in the transmission table includes an address in the memory circuit pointing to a memory location at which the data packet is stored. The entries in the transmission table are created in response to a command from a host computer interfaced to the system of the present invention over an industry standard bus, e.g. a PCI bus. The transmission circuit of the present invention can be used in conjunction with synchronous transmission media such as a fibre optics communication system.

Using the transmission table of the present invention, a large number of constant bit rate channels of various bit rates can be managed in real time using a state machine, which causes a data packet to be transmitted for each of the entries encountered.

In one embodiment of the present invention, in addition to the constant bit rate channels, variable bit rate channels are also supported. In that embodiment, the variable rate channels are ordered in accordance with a predetermined priority. When a variable rate entry in the transmission table is accessed, the state machine polls the variable bit rate channels in order of the predetermined priority. When the first variable bit rate channel having a data packet ready for transmission is polled, the transmission circuit sends the data packet.

In accordance with another aspect of the present invention, a "negative credit" counter, which is initially set at a predetermined value, measures how far the transmission schedule falls behind. In conjunction with the operation of the negative credit counter, the host computer writes into the transmission table a number of special entries, each representing the transmission of a "forced null cell". Normally, i.e. when the negative credit counter remains at the predetermined value, when such a special entry is accessed, the transmission circuit sends an ATM cell consisting solely of bytes of zeroes. However, when the transmission of any of the data packets is delayed by one ATM cell, the negative credit counter is incremented by one. In accordance with the present invention, while the negative credit counter contains a value greater than the predetermined value, when one of the special entries, a variable rate channel, or a unspecified rate channel is accessed, the control circuit immediately skips that entry and accesses the next entry in the transmission table, while simultaneously decrementing the negative credit counter by one. Because of this arrangement, the delay in ATM cell is compensated by skipping transmission of ATM cells which transmission is not as time-critical as those of a constant bit rate channel.

In accordance with another aspect of the invention, a system and a method for segmenting a data message into packets of a predetermined size for transmission in a computer network are provided. In that system, a host computer running a control program is coupled to a host memory system. The control program creates a buffer in the host memory system to contain a data message and provides to the segmentation circuit an address with which to access the buffer. The transmission or segmentation circuit retrieves the data message using the address from the buffer in the host memory system a portion at a time, using a portion size which is smaller than the size of the data packet. Each portion is then transmitted into the computer network in the data packet of the predetermined size, which includes, in addition to the portion of the data message, control and identification information. In one embodiment, the host computer, the host memory, and the transmission or segmentation circuit are coupled by a bus, and the transmission circuit accesses the host memory via direct memory access. In one embodiment, the control program provides the address to the buffer in a control message. In that embodiment, the transmission circuit includes (i) a data queue for receiving the control message from the control program; (ii) a status queue made accessible to the control program to allow the control program to retrieve a status message; and (iii) a logic circuit which reads the control message from the data queue. The logic circuit (i) retrieves from the control message the address to the buffer; (ii) accesses the buffer in the host memory the portions of the data message; (iii) transmits into the computer network the portions of the data message in the data packets; and (iv) provides a status message for retrieval by the control program, so as to indicate complete transmission of the data message.

In accordance with another aspect of the present invention, the control program provides a second control message to be received by the data queue. Upon receiving this second control message, the logic circuit provides a second status message ("reply message") in the status queue for retrieval by the control program. This arrangement allows the control program to monitor the throughput of the data queue. In that embodiment, the second control message includes a control word, which content is determined by the control program. This control word is copied by the segmentation circuit in its reply status message so that the control program may identify the reply message with the control message which triggers it.

In the present invention, the control signal from the transmission circuit provides a backward pressure on the segmentation circuit to retrieve additional ATM cell payloads from the host memory. As a result, the unit of "time" in the present invention is the number of ATM cell slots, rather than cycles of a clock signal. Thus, jitters relating to round-off errors are avoided by the present invention. Also, the present invention allows an accurate bus clock signal at an output synchronous bus to "throttle" the rate of transmission for the CBR channels, thereby obviating the need to provide an additional time base for the segmentation circuit. Within the CDV tolerance, the present invention provides a graceful degradation in CDV performance without a break in service. Further, the mechanism of the present invention allows a CBR service to recover from a latency by allowing the delayed transmission schedule to "catch up".

The present invention is better understood upon consideration of the detailed description below and the accompanying drawings.

DETAILED DESCRIPTION OF THE PREFERRED EMBODIMENTS

Figure 2A:
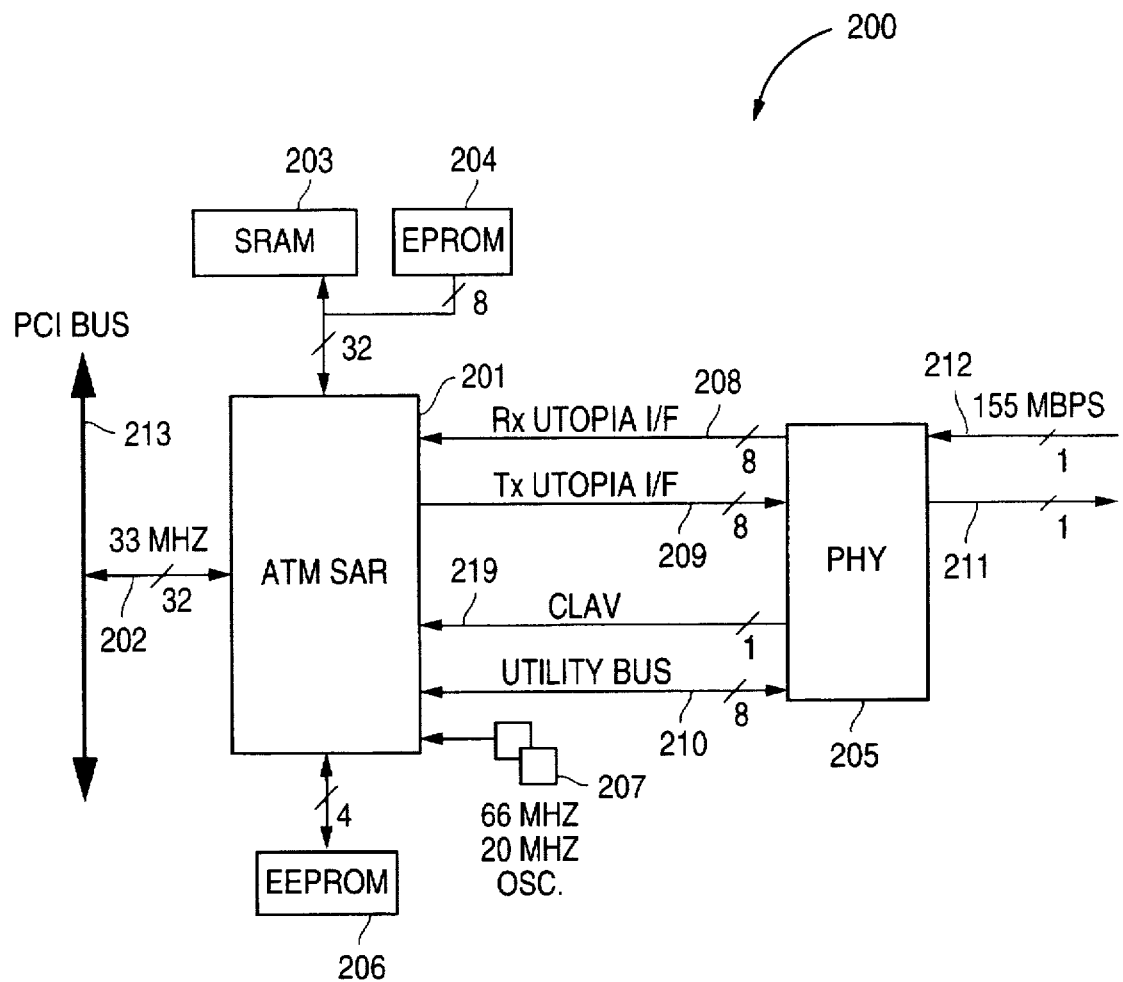
FIG. 2a shows a system 200 in which an ATM segmentation and reassembly (SAR) circuit 201 is provided, in accordance with the present invention.

The present invention can be implemented as an ATM segmentation and reassembly (SAR) circuit in integrated circuit form. FIG. 2a shows a system 200 in which such an ATM SAR circuit 201 is provided. As shown in FIG. 2a, an ATM SAR circuit 201 interfaces with a host computer (not shown) over a Peripheral Component Interconnect (PCI) bus 213. The PCI bus is known to those skilled in the art, being defined in *PCI Local Bus Specification*, Production Version, Revision 2.0, Apr. 30, 1993. A software driver which runs on the host computer provide control of the operation of ATM SAR circuit 201 in accordance with the principles of operation described below.

As shown in FIG. 2a, ATM SAR circuit 201 accesses a memory system including non-volatile memories[2] 204 and 206 (e.g. implemented in EPROM and TEPROM), and volatile memory 203 (e.g. implemented in SRAM[3]). ATM SAR circuit 201 exchanges data with the host computer over PCI bus 213, and exchanges ATM cells with physical medium (PHY) 205. An example of a physical medium 205 suitable for use in this embodiment is a system using fiber optics. In this embodiment, the interface between ATM SAR circuit 201 and PHY 205 is provided by the industry standard UTOPIA interface. As shown in FIG. 2a, ATM SAR circuit 201 and PHY 205 exchange data over bus 208 (Receive UTOPIA interface) and bus 209 (Transmit UTO-PIA interface) in a byte-parallel fashion. A utility bus 210 passes control information between ATM SAR circuit 201 and PHY 205. A control signal 219 ("CLAV") is provided from PHY 205 to ATM SAR circuit 201 to indicate completion of a cell transmission. PHY 205 receives and transmits ATM cells in bit-serial fashion over serial links 211 and 212, respectively. ATM SAR circuit 201 receives clock signals from clock circuit 207 which includes oscillators running at 66 and 27 Mhz frequencies.

[2] EPROM and EEPROM are acronyms for "electrically programmable read-only memory" and "electrically erasable programmable read-only memory" respectively.
[3] SRAM is an acronym for Static Random Access Memory.

Figure 2B:
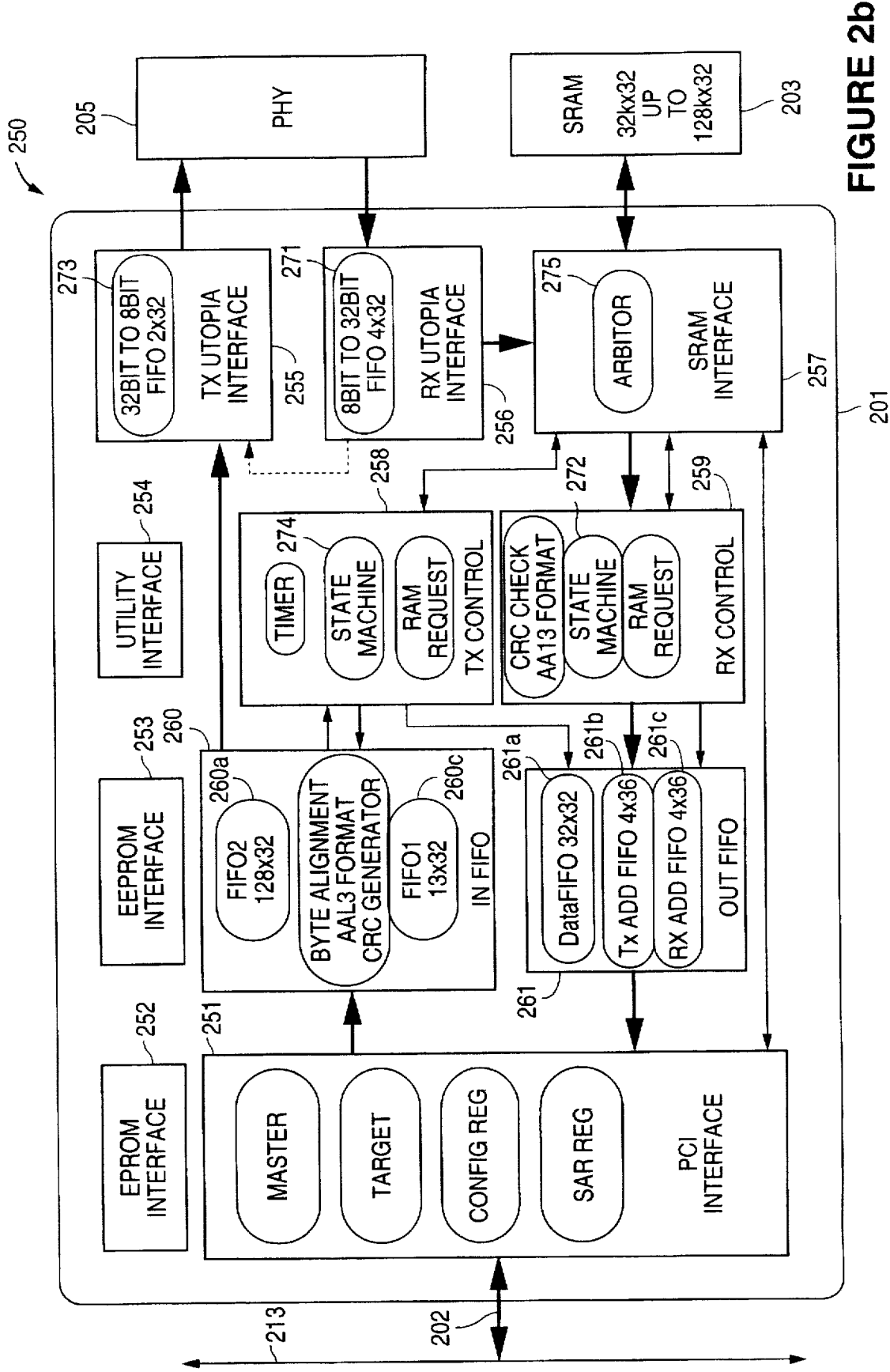
FIG. 2b is a block diagram 250 of FIG. 2a's ATM SAR circuit 201.

FIG. 2b is a block diagram 250 of ATM SAR circuit 201. ATM SAR circuit 201 interfaces with PCI bus 213 via 32-bit built-in PCI interface 251. Specifically, PCI interface 251 sends and receives data over a 32-bit multiplexed address and data bus 202 of PCI bus 213. In addition, ATM SAR circuit 201 is provided with EPROM interface 252, EEPROM interface 253, utility interface 254, and SRAM interface 257 to allow accesses to EPROM 204, EEPROM 206, PHY 205 (over utility bus 210) and SRAM 203, respectively. In this embodiment, SRAM 203 can be implemented by a 32-bit wide SRAM array having a capacity between 32K to 128K words. SRAM 203 can also be accessed by the host computer. SRAM interface 257 includes an arbiter 275, which determines priority of SRAM accesses among the access requests received from the host computer and the functional units of ATM SAR circuit 201 (e.g. transmit control circuit 258 and receive control circuit 259).

Figure 1:
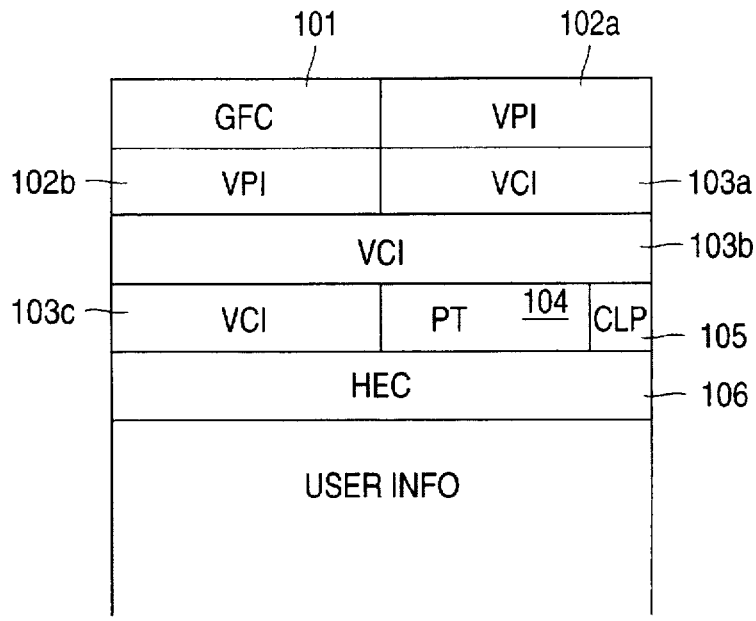
FIG. 1 shows the format of the 5-byte header in an ATM cell.

SAR circuit 201 receives ATM cells from PHY 205 via the Receive UTOPIA interface 256, which provides flow control for incoming ATM cells. The ATM cells thus received are written into a FIFO ("RX FIFO") structure 271 inside receive UTOPIA interface 256. In this embodiment, the error control byte (i.e. HEC byte 106 in FIG. 1) of the ATM cell received is not written into RX FIFO 271, so that each ATM cell fits into 13 32-bit words. Thus, RX FIFO 271, which is 4096 words long in this embodiment, can store 315 ATM cells. The received ATM cells are then transferred over to the host computer's main memory 280 (not shown) via RX FIFO unit 261 and PCI bus interface 251.

Figure 3A:
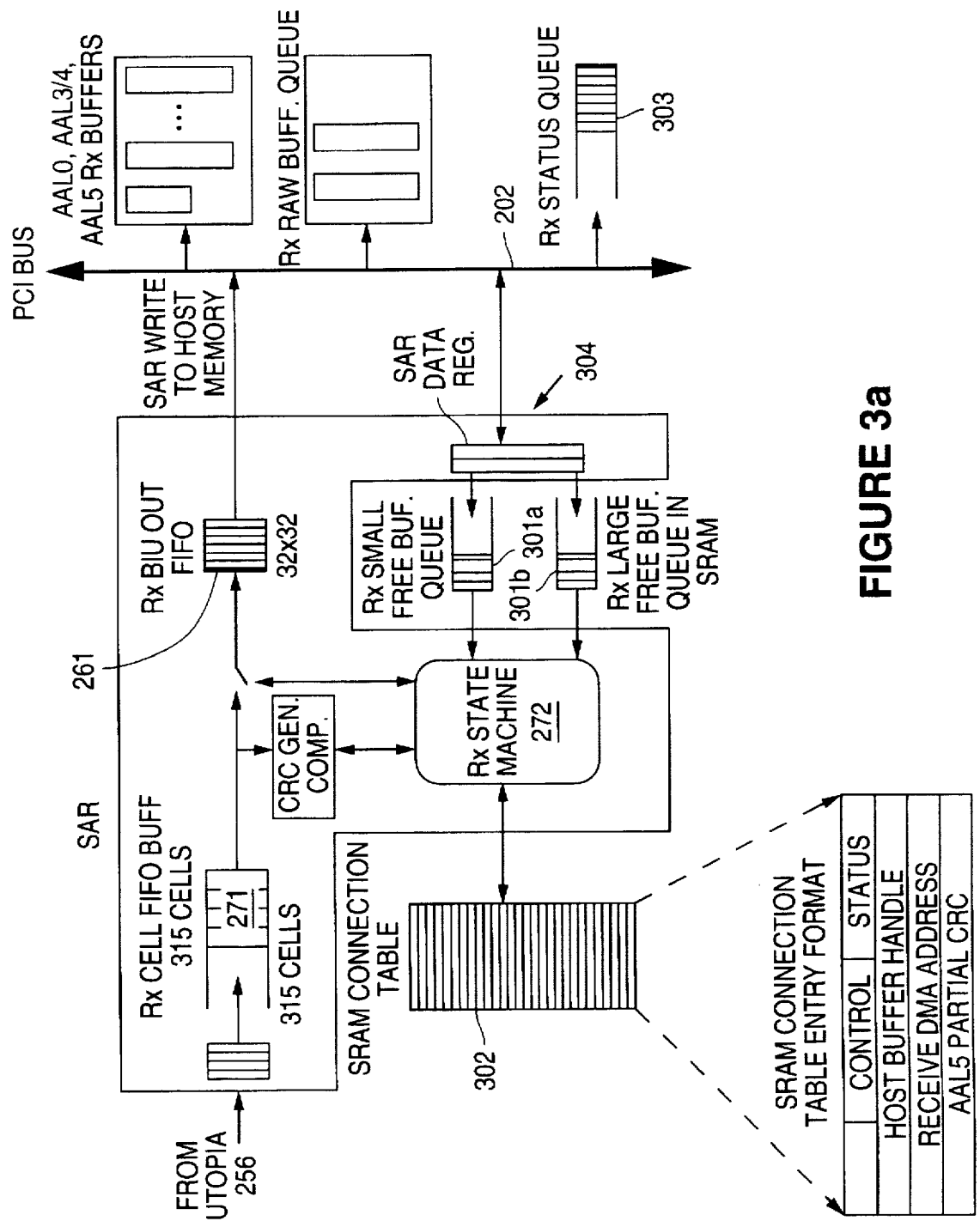
FIG. 3a shows the operations of SAR circuit 201 in receiving ATM cells.

The receive operations of SAR circuit 201 are now explained in further detail in conjunction with FIG. 3a. In this embodiment, the host computer (not shown) provides SAR circuit 201 with buffers in main memory 280. The host computer makes the buffers available to SAR circuit 201 through two buffer queues written by the host computer into SRAM 203: small buffer queue 301a and large buffer queue 301b. Small buffer queue 301a and large buffer queue 301b are so named for the relative sizes of the buffers they reference. Each entry in small buffer queue 301a and large buffer queue 301b, called a free buffer descriptor, consists of two 32-bit words representing two fields: (a) a 32-bit identification code identifying the buffer, called the "handle"; and (b) the direct memory access (DMA) address of the physical location in host memory 280 at which the buffer resides. In this embodiment, small buffers can be configured as 64, 128 or 256 bytes, corresponding to a capacity of 1, 2 or 5 cells. Large buffers can be configured as 2K, 4K, 8K or 16K bytes, corresponding to a capacity of 42, 85, 170 or 341 cells.

As shown in FIG. 3a, SAR circuit 201 receives ATM cells from receive UTOPIA interface 256. The received ATM cells are queued at the Rx FIFO 271. Receive state machine 272 (within receive control unit 259 of FIG. 2b) reads each received ATM cell's VPI/VCI fields from RX FIFO 271. The VPI/VCI fields are used to search SRAM 203 for a corresponding entry in a connection table 302. In this embodiment, an entry in connection table 302 provides, for each VPI/VCI combination, (i) control information from the host computer and status information from SAR circuit 201, (ii) the handle to an existing buffer allocated for the current CS-PDU of that VPI/VCI combination; (iii) a DMA address for writing the payload of the current received ATM cell into the buffer; and (iv) under AAL type 5, a partial error control cyclic redundancy code (CRC) checksum to keep track of the CS-PDU's integrity. In this embodiment, connection table 302 can accommodate at least 4096 entries in a 32K SRAM to provide at least 4096 virtual channels.

At the beginning of each CS-PDU, receive state machine 272 retrieves a free buffer descriptor from small buffer queue 301a and updates the buffer handle and DMA address fields in the entry of the connection table 302 corresponding to the VPI/VCI combination. Thereafter, the buffer is used to receive the payloads of ATM cells for that VPI/VCI combination, until all ATM cells in the CS-PDU are received, or the buffer is completely filled. The DMA address in the corresponding entry of connection table 302 is updated as the ATM cells for that VPI/VCI are received, filling the buffer. The payloads of each ATM cell received to be transmitted to the host computer is queued at data FIFO 261a of RX FIFO unit 261 (FIG. 2b). In this embodiment, data FIFO 261a is provided by a 32×32-bit words FIFO, which is capable of holding the payloads of two ATM cells. Simultaneously, the buffer handle and the DMA address of the next cell in the allocated buffer are written into RX address FIFO 261c of RX FIFO unit 261. In this embodiment, RX address FIFO 261c is provided by a 4×36-bit FIFO to hold the two buffer handle-DMA address pairs, corresponding to the two ATM cell payloads of data FIFO 261a. The ATM payloads in data FIFO 261a are written by DMA into host memory 280 over PCI bus 202, using the corresponding DMA addresses in RX address FIFO 261c. When the total size of the payloads of the ATM cells received for a VPI/VCI combination exceeds the size of the small buffer, a large buffer is allocated by retrieving a free buffer descriptor from large buffer queue 301b for subsequent ATM cells received for that virtual channel. The software driver in the host computer provides, via SAR data registers 304, two buffers at a time to each buffer queues 301a and 301b. SAR data registers 304 include four 32-bit data registers for holding two buffer handles and two DMA addresses. Writing into main memory 280 is completed by PCI bus interface unit 251.

Figure 4B:
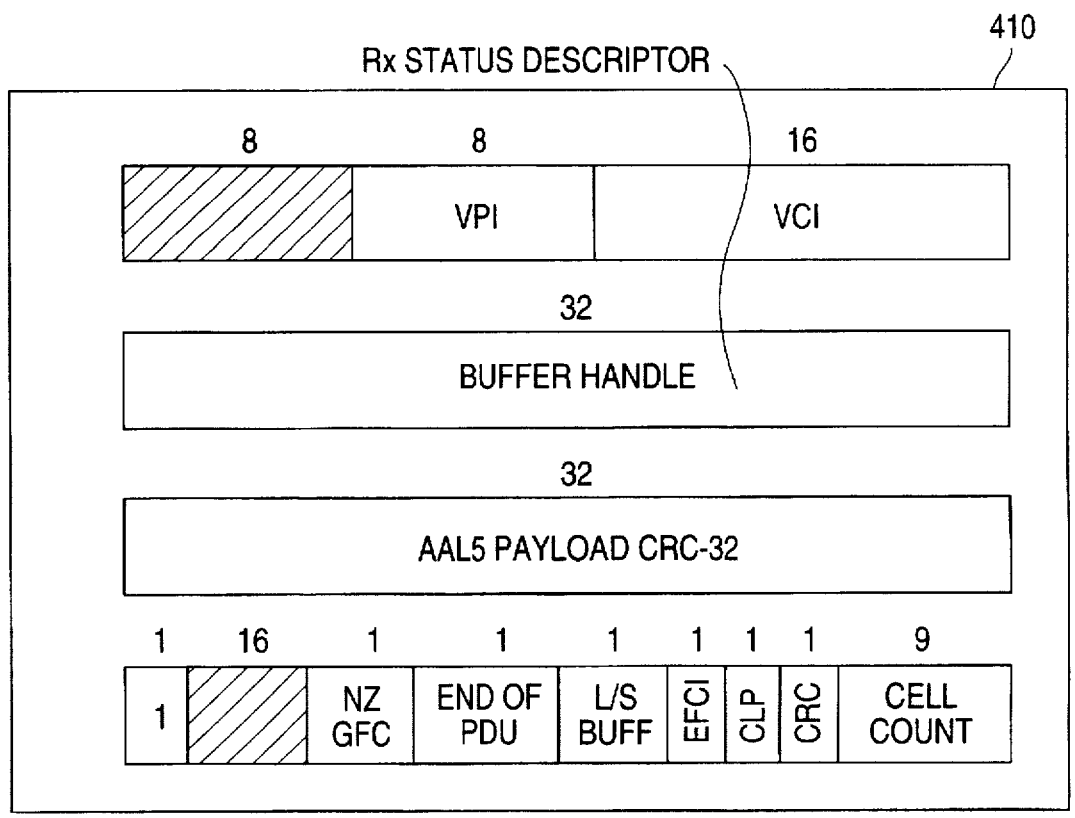
FIG. 4b shows the format of a RX status descriptor 410.

When the end of a buffer or the end of a CS-PDU is reached, SAR circuit 201 notifies the host computer by writing a RX status descriptor into RX status queue 303 in main memory 280. FIG. 4b shows the format of a RX status descriptor 410. In this embodiment, as shown in FIG. 4b, Rx status descriptor 410 consists of four 32-bit words. These four 32-bit words are: (i) the VPI/VCI of the buffer; (ii) the handle to the buffer; (iii) if AAL type 5 is used, the partial CRC checksum; and (iv) a status word indicating the status of the CS-PDU. Receive status queue 303 is managed by three registers in ATM SAR circuit 201: (i) a receive status queue base address register, which points to an area in the host memory allocated to transmit status queue 303; (ii) a receive status queue head pointer, which points to the first entry in receive status queue 303; and (iii) a receive status queue tail pointer, which points to the last entry in receive status queue 303. When the system is initialized, the software driver in the host computer allocates receive status queue 303 and writes the beginning address into receive status queue base address register. Whenever a receive status descriptor is read from receive status queue 303 by the software driver in the host machine, the receive status queue head register is updated, and whenever a receive status descriptor is written into receive status queue 303 by SAR circuit 201, receive status queue tail register is updated.

The present embodiment also supports receipt of "raw" ATM cells. Raw ATM cells are cells which can not be identified to a specific VPI or VCI. In processing raw ATM cells, when the last 16 bytes ("last slot") of a buffer is reached, SAR circuit 201 retrieve a free buffer descriptor from large buffer queue 301b. The handle and the DMA address to the large buffer in the retrieved free buffer descriptor are then written into the last slot of the current buffer. The payload of the next ATM cell is then written into the retrieved large buffer. Further processing of the raw ATM cells are handled by the software driver in the host computer. In this embodiment, the initial buffer for receiving raw cells are allocated from a RX raw buffer queue maintained in main memory 280.

The transmit operations of SAR circuit 201 are next described in conjunction with FIGS. 2b, and 3b–3d. Referring back to FIG. 2b, during transmission, buffer handles for a CS-PDU are transferred by DMA from main memory 280 to SRAM 203. The cell header of the next ATM cell to be transmitted, except for the HEC field, is then read from SRAM 203 into UTOPIA FIFO 273. Using the buffer handle, the ATM cell's payload is then transferred by DMA from main memory 280 into UTOPIA FIFO 273. SAR circuit 201 then inserts into the HEC field of the ATM cell a place holder value (in this embodiment, 'H00). This ATM cell is then sent via transmit UTOPIA interface 255 to PHY 205. Upon completion of transmission, PHY 205 asserts CLAV signal 219 to indicate the completion and to request for the next ATM cell. In this embodiment, SAR circuit 201 handles CS-PDUs of any size up to 65536 long, provided the length of the CS-PDU is a multiple of 48 bytes.

Figure 3B:
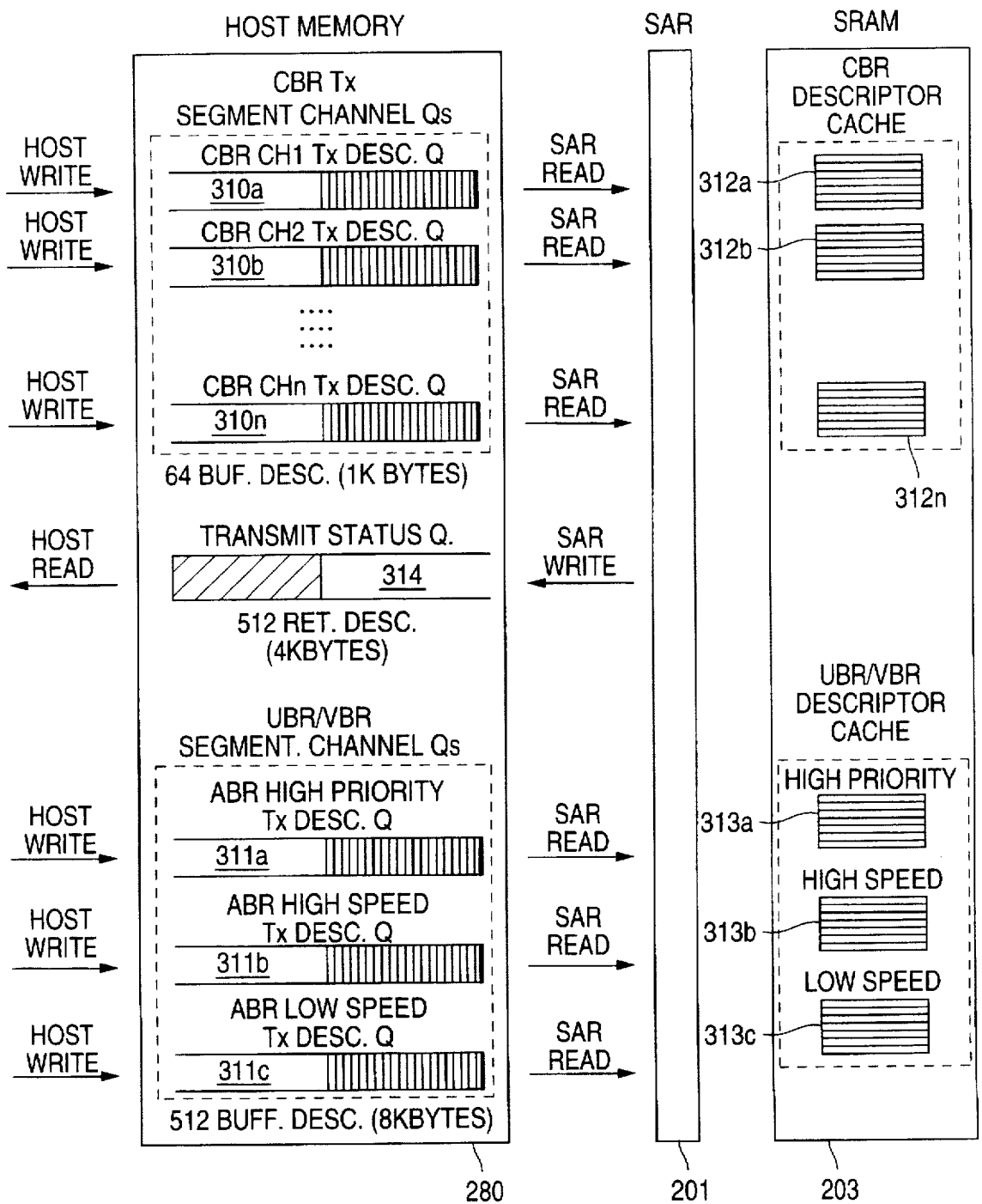
FIG. 3b shows, in both the host computer's main memory 280 and SRAM 203, the data structures for transmitting ATM cells at constant bit rates (CBR), unspecified bit rate (UBR) and variable bit rate (VBR).
Figure 4A:
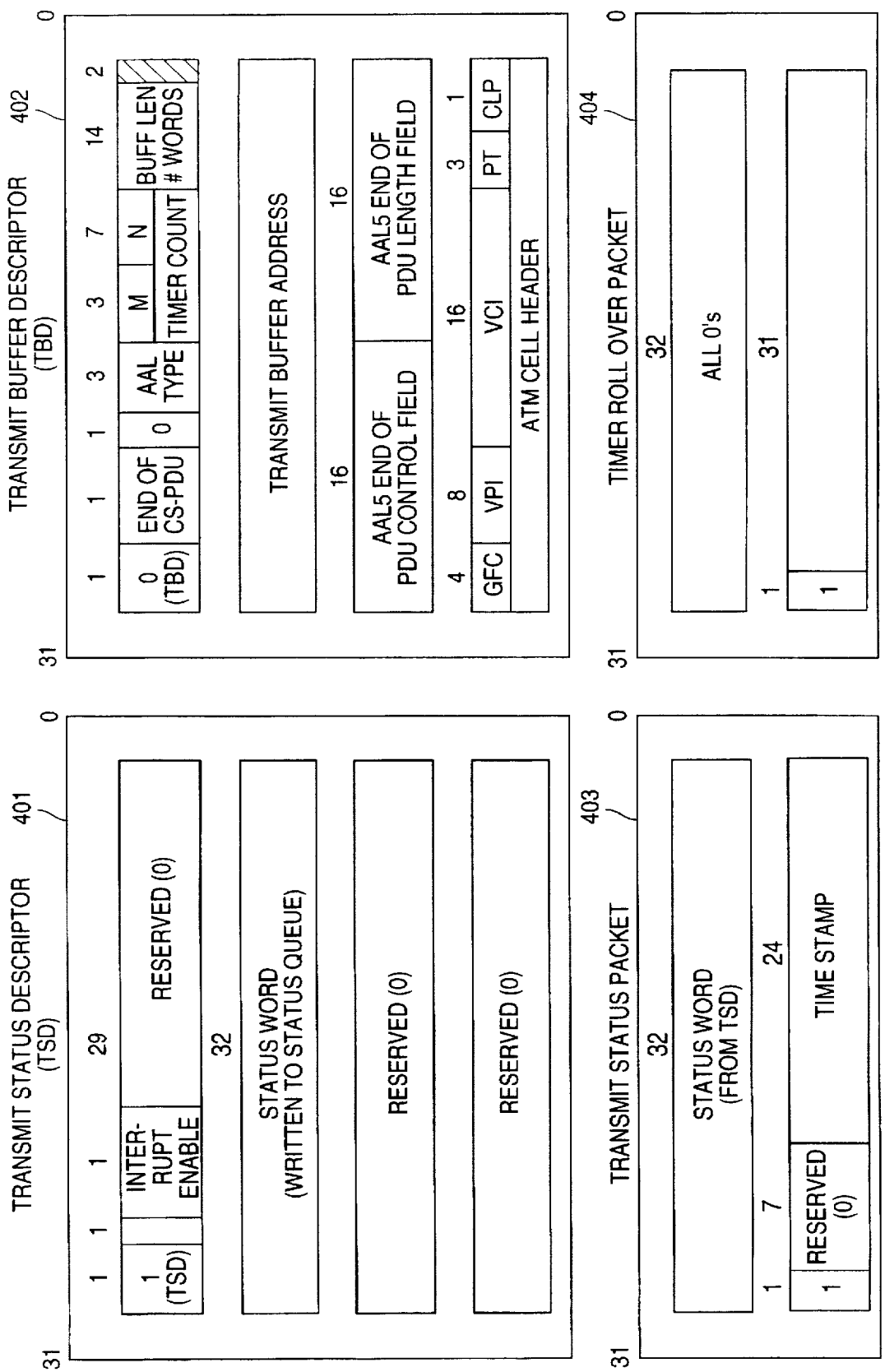
FIG. 4a shows the formats of a transmit buffer descriptor 402, a transmit status descriptor 401, a transmit status packet 403, and a timer rollover packet 404.
Figure 4C:
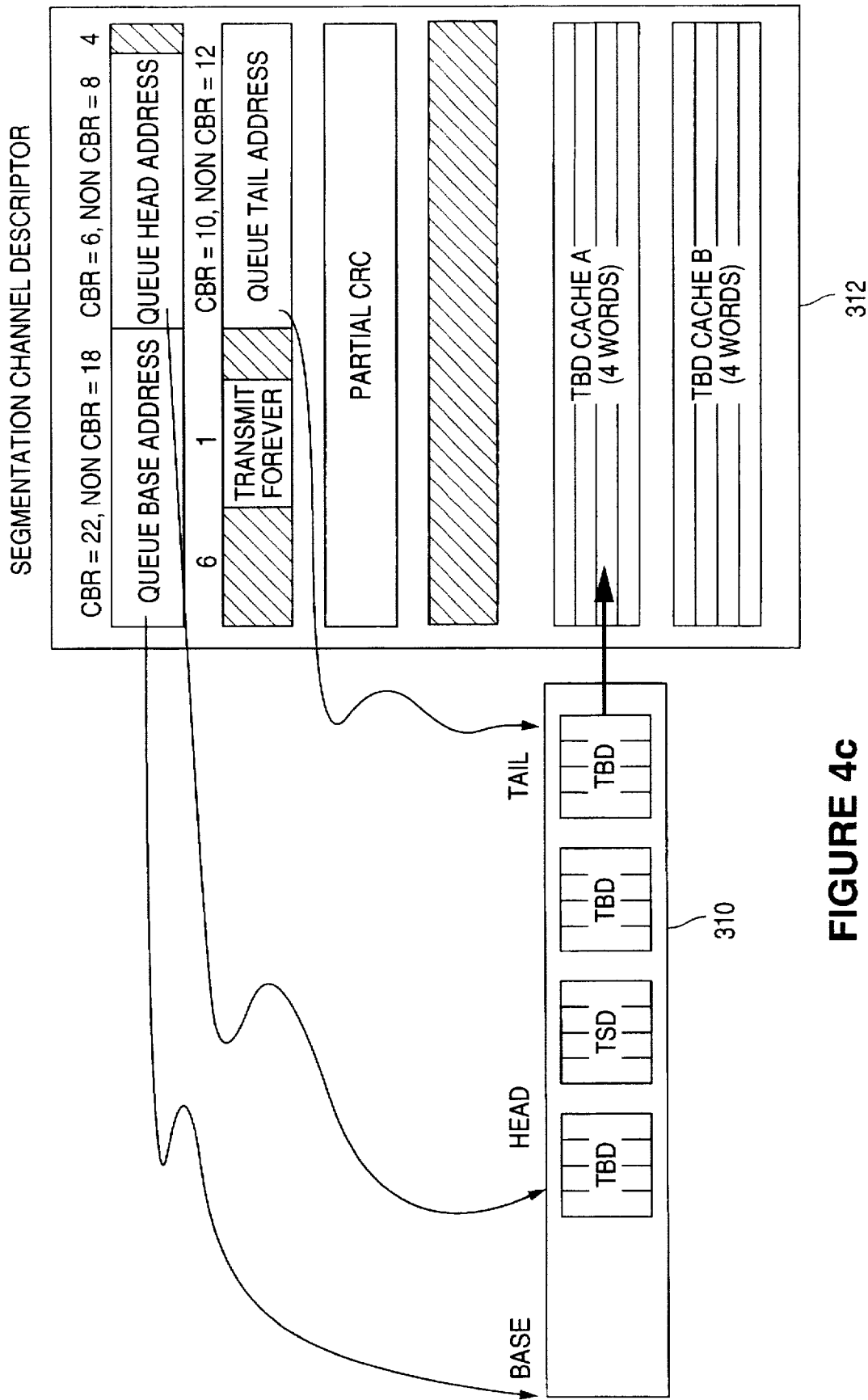
FIG. 4c shows the format of a segmentation channel descriptor 312.

SAR circuit 201 supports transmission of ATM cells at the following bit rates: (a) unspecified bit rate ("UBR"); (b) variable bit rate ("VBR"); and (c) constant bit rate ("CBR"). FIG. 3b shows the data structures in main memory 280 and SRAM 203 for supporting transmission of ATM cells at the CBR, UBR, and VBR bit rates. As shown in FIG. 3b, the host computer maintains in main memory 280 separate segmentation channel queues 310a–310n for the n virtual channels in FIG. 3b. In addition, the host computer maintains separate segmentation channel queues 311a–311c for three classes of priority or speed for UBR and VBR channels. When each segmentation channel queue is created in main memory 280, a corresponding segmentation channel descriptor is allocated in SRAM 203 to be accessed by SAR circuit 201. The format of a segmentation channel descriptor is provided in FIG. 4c. As shown in FIG. 4c, each segmentation channel descriptor includes (i) address pointers pointing to (a) the base address of the corresponding segmentation channel queue, (b) the head of the corresponding segmentation channel queue, and (c) the tail of the corresponding segmentation channel queue; (ii) a 32-bit partial CRC checksum, which is used to compute an over all CRC checksum for the CS-PDU; and (iii) a cache for caching two transmit buffer descriptors read from the corresponding segmentation channel queue. FIG. 3b shows in SRAM 203 segmentation channel descriptors 312, each segmentation channel descriptor corresponding to one of segmentation channel queues 310a–310n, and segmentation channel descriptors 313a–313c, each corresponding to one of UBR/VBR segmentation channel queues 311a–311c.

Each entry in a segmentation channel queue can be either a transmit buffer descriptor or a transmit status descriptor. A transmit buffer descriptor points to a transmit buffer in main memory 280 containing either a CS-PDU or a portion of a CS-PDU, depending upon the size of the CS-PDU. A transmit status descriptor, which is distinguished from a transmit buffer descriptor by a 1-bit control/status field (the control/status field of the transmit status descriptor is set to '1'), is used by the software driver in the host computer to request status information from SAR circuit 201. The formats of a transmit buffer descriptor and a transmit status descriptor are described below and are shown in FIG. 4a. (FIG. 4a shows the formats of a transmit buffer descriptor 402, a transmit status descriptor 401, a transmit status packet 403, and a timer rollover packet 404). As shown in FIG. 4a, transmit buffer descriptor 402 consists of the following fields provided in four 32-bit words:

(a) a 1-bit control/status field which, for a transmit buffer descriptor, is set to '0';

(b) a 5-bit control word, which is used (i) to indicate the last buffer for a CS-PDU, (ii) to indicate whether SAR circuit 201 interrupts the host computer upon completing transmission of a CS-PDU, and (iii) to indicate the AAL type;

(c) (for VBR or UBR ATM cells) a 10-bit real number which is used as a timer; this 10-bit timer is loaded when this VBR and UBR ATM cell is sent from the segmentation channel queue in main memory 280 to which this transmit buffer descriptor belongs;

(d) a 13-bit value indicating the length of the transmit buffer described by this transmit buffer descriptor;

(e) a 32-bit DMA address indicating the starting location in main memory 280 of the next 48-byte to be sent as payload in an ATM cell;

(f) a 32-bit AAL type 5 control word, consisting of a 16-bit control field written by the host computer and a 16-bit AAL type 5 CS-PDU length field[4]; and

[4] This field is used only under AAL type 5 processing; this 32-bit AAL type 5 control word is appended as the 41st–44th bytes in the last ATM cell of a CS-PDU. SAR circuit 201 appends a 32-bit CRC as the 45th–48th bytes of the ATM cell.

(g) the first four bytes of an ATM cell's 5-byte header.

Transmit status descriptor 401 consists of four 32-bit words including the fields:

(a) a 1-bit control/status field which, for a transmit status descriptor, is set to '1';

(b) a 1-bit interrupt enable bit; and (c) a 32-bit status word, which includes identification status information written by the software driver (e.g. a code identifying the segmentation channel queue and a sequence number).

In the embodiment shown in FIG. 3b, segmentation channel queue 311a is a high priority queue (50–155 megabits per second), segmentation channel queue 311b is a high speed queue and segmentation channel queue 311c is a low speed queue (up to 50 megabits per second). When the host computer writes a transmit status descriptor into any of the queues 310a–310n and 311a–311c, such as when initializing a virtual channel, the software driver writes control information into the second 32-bit word (transmit status word) of the transmit status descriptor. When transmit status information, in the form of transmit status packets, are reported back by SAR circuit 201 to the host computer via transmit status queue 314 (FIG. 3b), such as upon completing the transmission of a CS-PDU, SAR circuit 201 writes a transmit status packet into transmit status queue 314. The software driver in the host computer can also monitor the throughput in a segmentation channel queue by writing into the segmentation channel queue a transmit status descriptor and waits for the transmit status packet returned by SAR circuit 201. Upon reading a transmit status descriptor from the segmentation channel queue, SAR circuit 201 returns a transmit data packet in transmit status queue 314. As shown in FIG. 4a, transmit status packet 403 contain a 32-bit transmit status word, which is copied from the transmit status word of a corresponding transmit status descriptor, and a 24-bit time stamp for indicating the time at which the transmit status word is valid. The software driver in the host computer can therefore use the timestamp returned in a transmit status packet to determine the throughput in a segmentation channel queue.

Transmit status queue 314 is managed by three registers in ATM SAR circuit 201: (i) a transmit status queue base address register, which points to an area in main memory 280 allocated to transmit status queue 314; (ii) a transmit status queue head pointer, which points to the first entry in transmit status queue 314; and (iii) a transmit status queue tail pointer, which points to the last entry in transmit status queue 314. When the system is initialized, the software driver allocates transmit status queue 314 and writes the beginning address into transmit queue base address register. Whenever a transmit status packet is read from transmit status queue by the software driver, the transmit status queue head register is updated, and whenever a transmit status packet is written into transmit status queue 314, transmit status queue tail register is updated.

Another kind of record received in transmit status queue is the timer rollover packet, such as timer rollover packet 404 of FIG. 4a. SAR circuit 201 writes a timer rollover packet into transmit status queue 314, whenever a timer (such as used in UBR and VBR queues) overflows. The timer rollover packet allows the software driver to properly interpret timestamps in transmit status packets. As shown in FIG. 4a, a timer rollover packet consists of a 32-bit word have a value '0' and a second 32-bit word with the most significant bit set to '1'.

When a complete CS-PDU is ready for transmission, the software driver in the host computer writes a transmit buffer descriptor into an appropriate segmentation channel queue and notifies SAR circuit 201. Depending upon its length, a CS-PDU may span one or more transmit buffers. The present invention provides a transmit cell schedule table (TCST), to be described below, for scheduling ATM cell transmissions. Upon retrieving a transmit buffer descriptor from a segmentation channel queue, SAR circuit 201 transfers the transmit buffer descriptor to the cache portion of the corresponding segmentation channel descriptor in SRAM 203 to be ready for transmission.

Figure 3C:
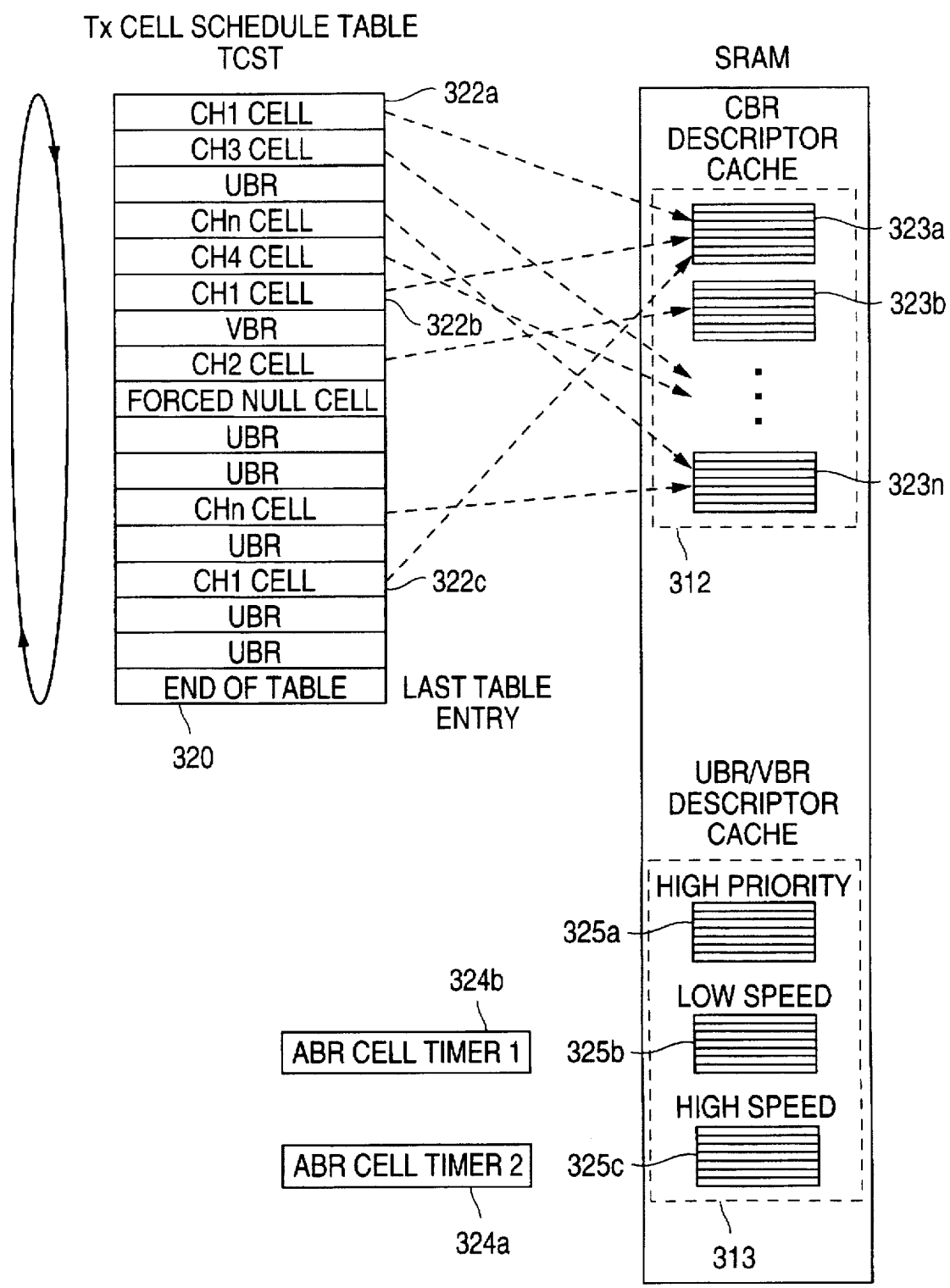
FIG. 3c shows the use of a transmit cell schedule table (TCST) 320, in accordance with the present invention.

The present invention provides a method for scheduling ATM cell transmission for CBR, UBR and VBR channels, using a TCST. FIG. 3c shows the use of TCST 320, in accordance with the present invention. TCST 320 is a circular table in SRAM 203, i.e. the last entry in the table indicates that the end of the table is reached and provides a pointer back to the beginning of the table. Each entry of TCST 320 represents a scheduled transmission of an ATM cell. Thus, adjacent entries in TCST 320 are separated by at least one ATM cell transmission time (i.e. approximately 2.7 microseconds for a 155 mbits per second line). Four kinds of entries can be found in TCST 320: (i) an entry for a CBR virtual channel, i.e. an entry specifying the segmentation channel descriptor of a CBR virtual channel; (ii) an entry specifying a pointer to a segmentation channel descriptor of an OAM, UBR or VBR virtual channel or an opportunity to transmit a "null cell"; (iii) an entry specifying transmission of a "forced null cell"; and (iv) an entry indicating the end of the TCST table. The null cells and forced null cells are used in a method of the present invention to maintain constant bit rates for CBR channels. This method is explained in further detail below. For CBR virtual channels, ATM cells are scheduled regularly according to the bit rate of the virtual channel. The size of TCST 320 is determined by the greatest common divisor of all bit rates supported. For example, if the slowest virtual channel is transmitting at 64 kilobits per second, and all higher bit rates supported are multiples of 64 kilobits per second, then TCST 320 would have 2422 entries. Each entry in TCST 320 consists of a 32-bit word, which has the following fields: (a) a 2-bit type, indicating whether the entry relates to (i) a CBR virtual channel, (ii) an opportunity to transmit a null cell or an ATM cell of an OAM, UBR or VBR channel, (iii) a forced null cell transmission, or (iv) the end of TCST 320; and (b) for a CBR channel, an address into SRAM 203 pointing to segmentation channel descriptor for the CBR channel.

Referring to FIG. 3c, TCST 320 has entries for virtual channels 1 through n ("CBR entries") of various constant bit rates. As mentioned above, each CBR entry of TCST 320 points to a segmentation channel descriptor of a CBR virtual channel in SRAM 203. As discussed above, each segmentation channel descriptor includes a 48-byte data segment cached in SRAM 203. For example, entries 322a, 322b, and 322c are successive entries in TCST 320 pointing to the segmentation channel descriptor of CBR virtual channel CH1.

Also shown in FIG. 3c are segmentation channel descriptors 325a–325c in UBR/VBR descriptor cache 313, corresponding to the buffer descriptors for buffers in the high priority, high speed and low speed queues 311a–311c. Associated with the high speed and low speed queues 311b and 311c are UBR cell timers 324a and 324b.

Figure 3D:
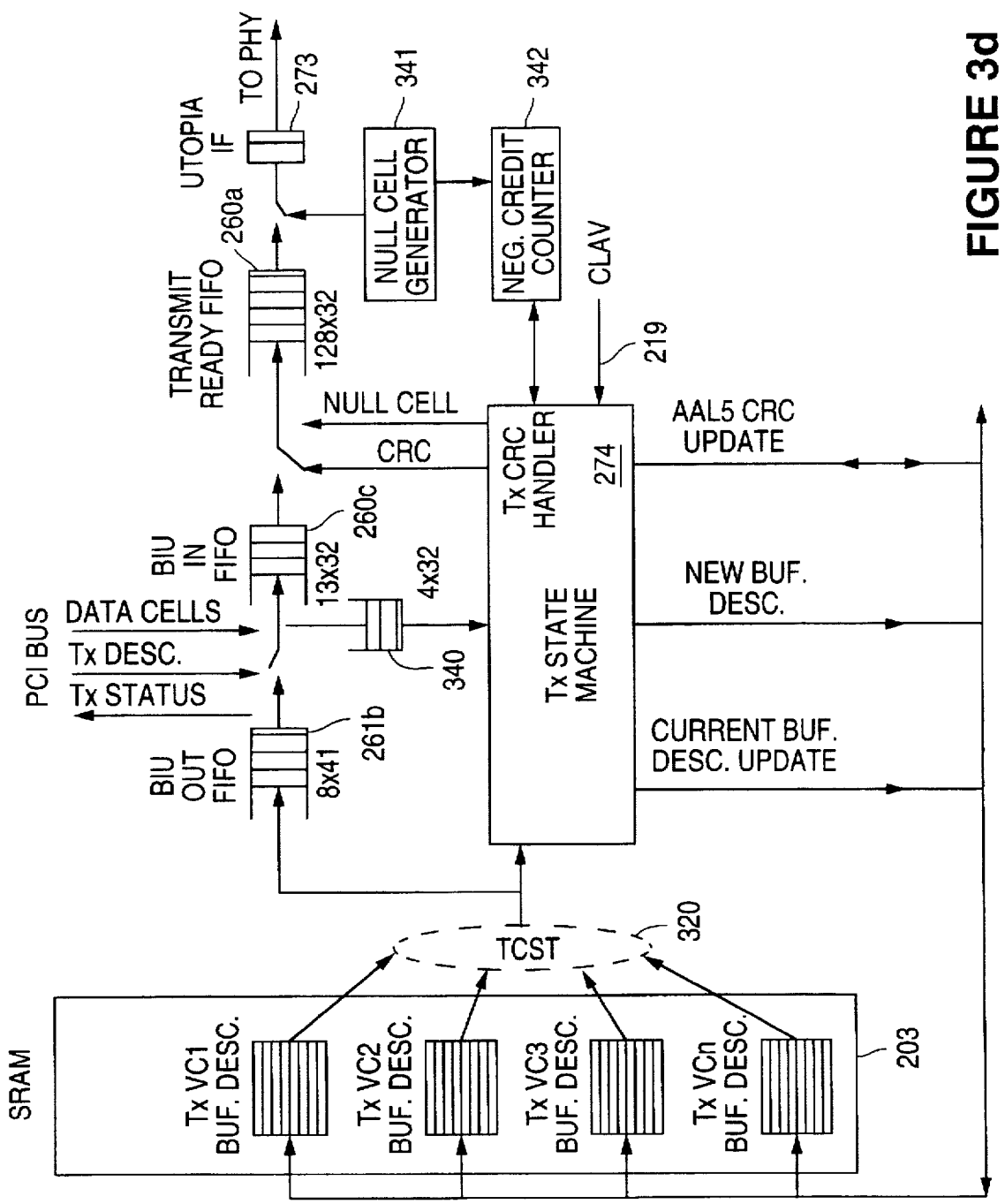
FIG. 3d shows the operations of SAR circuit 201 in transmitting ATM cells.

The transmission operations of SAR circuit 201 are described next in conjunction with FIG. 3d. Referring to FIG. 3d, when a new CS-PDU is ready for transmission, the software driver in the host computer sends to transmit state machine 274 one or more transmit buffer descriptors, each pointing to a buffer containing a portion of the CS-PDU. A FIFO 340 (a 4×32-bit FIFO) is provided to hold the transmit buffer descriptors received over the PCI bus. If a new virtual channel needs to be created, the software driver in the host computer directs transmit state machine 274 to set up a new virtual channel by creating a segmentation channel descriptor. State machine 274 segments the content of each buffer into 48-byte data segments to be each transmitted as the payload of an ATM cell. If the virtual channel is a CBR channel, transmit state machine 274 provides one or more entries in TCST 320 according to the specified bit rate and the entries' corresponding buffer descriptors in SRAM 203. When there is room in transmit ready FIFO 260a, transmit state machine 274 of transmit control unit 258 scans the next entry in TCST 320 for a scheduled ATM cell transmission. If a CBR entry is encountered, SAR circuit 201 reads, from the cached CBR transmit buffer descriptor, the DMA address and the four header bytes. The four header bytes in the CBR transmit buffer descriptor are read into SAR circuit 201's bus interface unit (BIU) input FIFO 260c (See, FIG. 2b's input FIFO unit 260). In this embodiment, BIU input FIFO 260c is a 13×32-bit FIFO. Then, SAR circuit 201 transfers 48 bytes of data from host memory 280 into FIFO 260c using a DMA access. The content of BIU input FIFO 260c is then packed into an ATM cell in transmit ready FIFO 260a. In this embodiment, transmit ready FIFO 260a is implemented as a 128×32-bit FIFO. For AAL type operations, SAR circuit 201 inserts a CRC checksum in the last cell of a CS-PDU. Transmit UTOPIA interface 255 transfers the ATM cell in transmit ready FIFO 260a into UTOPIA FIFO 273 two 32-bit words at a time for transmission by PHY 205, which accesses UTOPIA FIFO 273 in an 8-bit serial fashion. Transmit state machine 274 then updates the cached transmit buffer descriptor in the segmentation channel descriptor of the virtual channel. For a AAL type 5 ATM cell transmission, a partial CRC checksum is kept in the segmentation channel descriptor. In this manner, TCST 320 allows a large number of CBR virtual channels of different bit rates to be managed in real time. When PHY 205 completes transmission of a cell, the CLAV signal 219 is asserted to indicate to transmit state machine 274 that PHY 205 is ready to retrieve the next ATM cell. This asserted CLAV signal 219 represents a backward pressure to cause transmit state machine 274 to provide the next ATM cell to transmit ready FIFO 260a. Normally, SAR circuit 201 maintains one or more ATM cells in transmit ready queue 260a. In the event that a cached transmit buffer descriptor indicates that the associated buffer is emptied, SAR circuit 201 initiate a request to read the next transmit buffer descriptor in the corresponding segmentation channel queue. In this manner, the transmission of an ATM cell at PHY 205 creates a back pressure pull into SAR circuit 201 a new data buffer for transmission.

If the entry in TCST 320 scanned is not a CBR entry, the next cached transmit buffer descriptor in the high priority segmentation channel descriptor 325a is checked. If a valid transmit buffer descriptor exists, the BIU output FIFO 261b is loaded with the buffer handle and the DMA address to send a high priority ATM cell. If there is no valid cached transmit buffer descriptor in the high priority segmentation channel descriptor 325a, then the next segmentation channel descriptor, corresponding to the high speed segmentation channel descriptor 325b, is then checked. In high speed segmentation channel descriptor 325b, if a cached transmit buffer descriptor's timer field indicates a time out, an ATM cell is sent. If no ATM cell is sent from the high speed segmentation channel descriptor 325b, segmentation channel descriptor 325c is then checked in a similar fashion for an ATM cell transmission. If no ATM cell is sent from any buffer descriptor of caches 325a, 325b or 325c, a null cell (i.e. an ATM cell consisting of all zeroes) is sent.

In the present embodiment, the host computer can "force" null cells to be transmitted by provided forced null cell entries in TCST 320. The forced null cell entries are placeholders in TCST 320 for unused bandwidth and for absorbing any latency causing the transmission of ATM cells to fall behind schedule. An example of such a latency occurs when a transfer of the payload from main memory 280 to transmit ready FIFO 260a is delayed because of a latency in PCI bus 213 exceeding an ATM cell transmission time. When the latency exceeds one ATM cell transmission time, the transmission of CBR ATM cells falls behind schedule. The present invention allows the scheduled transmission of forced null cells and UBR/VBR cells to be skipped, when such a latency occurs. The skipping of a forced null cell transmission compensates the latency by moving up transmission of ATM cells by one ATM cell time. Since UBR and VBR services do not have the same stringent low CDV requirement as a CBR service, the present invention tradesoff performance of a UBR or VBR service in favor of low CDV in a CBR service.

To support the null cell mechanism, null cell generator 341 and negative credit counter 342 are provided. A null cell is defined by 53 consecutive bytes of zeroes. Initially, the negative credit counter is initialized to zero. When the transmit ready FIFO 260a becomes empty, due to a delay in transferring the payload of an ATM cell from main memory 280, one or more null cells are generated by null cell generator 341 and loaded into transmit ready FIFO 260a. The null cell or cells are transferred to UTOPIA FIFO 273 and provided by transmit UTOPIA interface 255 for transmission by PHY 205. For each null cell sent, negative credit counter 342 is incremented by one to indicate that an additional ATM cell transmission time is missed. When transmit state machine 274 scans a forced null cell entry or UBR/VBR entry in TCST 320, if the count in negative credit counter is greater than zero, the forced null cell entry or UBR/VBR entry is skipped and negative credit counter 342 is decremented. The entry following the forced null cell entry is then examined. Catch up is complete when the count in negative credit counter 342 returns to zero. In this manner, the scheduled defined in TCST 320 is maintained. Note that, in many ATM networks, the number of null cell or UBR/VBR entries that can be skipped may be limited by the CDV tolerance (CDVT) of the ATM network. In CBR channels, CDVT is a negotiated connection parameter. The present method thus provides a graceful degradation of CDV performance without a break in service. Of course, the user must avoid overloading the system, such as by excessive traffic on PCI bus 213, such that CDVT or the prescribed rate of a CBR service cannot be met even under the present invention.

In this embodiment, since complete ATM cells are continuously sent, timing of data packet transmission is based no longer on the cycles of clock signal, but by the number of ATM cell slots. As a result, jitters caused by round-off errors in rate timers are avoided. In addition, because CLAV signal 219 is sent by PHY 205 to state machine 274 whenever an ATM cell completes transmission, a separate time base for SAR circuit 201 is unnecessary. The system in the present invention can rely on the highly accurate clock signal in PHY 205, such as the clock signal from either serial link 211 or serial link 212. Thus, PHY 205's accurate transmit clock "throttles" an accurate rate of transmission for each CBR service. In addition, since the unit of "time" in a system of the present invention is the number of ATM cell slots, rather than the number of cycles of a clock signal, different line rates can be used without special tuning of SAR circuit 201.

The detailed description above is provided to illustrate the specific embodiments of the present invention and is not intended to be limiting. Numerous modification and variations within the scope of the invention are possible. The present invention is defined by the appended claims.

We claim:

1. A system for managing multiple constant bit rate channels for transmitting data packets, comprising:

a memory circuit;

a control circuit for (i) maintaining in said memory circuit a transmission table having a plurality of entries, each entry representing an opportunity for transmitting a data packet; (ii) creating, for each of said multiple constant bit rate channels, a number of corresponding entries in said transmission table proportional to the bit rate of said channel; (iii) accessing in sequential order said entries of said transmission table whenever a data packet is transmitted; and (iv) for each entry accessed, sending a control signal indicating that a data packet of the channel to which said entry corresponds is to be transmitted; and a transmission circuit, receiving said control signal, for transmitting said data packet.

2. A system as in claim 1, wherein said entry in said transmission table includes an address of said memory circuit corresponding to a memory location at which said data packet is stored.

3. A system as in claim 1, wherein said control circuit creating said entries in said transmission table in response to a command from a host computer interfaced to said system over an industry standard bus.

4. A system as in claim 1, wherein said data packet is an ATM cell.

5. A system as in claim 1, wherein said transmission circuit interfaces with a fibre optics communication system.

6. A system as in claim 1, further comprising a counter initially set at a predetermined value, said control circuit further creating in said transmission table a plurality of special entries, wherein when a transmission of any of said data packets is delayed by that time required for transmission of a packet, said counter is incremented by one, and wherein when said control circuit accesses one of said special entries, while said counter is greater than said predetermined value, said control circuit immediately accesses a next entry in said transmission table and decrements said counter by one.

7. A system as in claim 6, wherein when said control circuit accesses one of said special entries and said counter is at said predetermined value, said transmission circuit sends a data packet filled with zeroes.

8. A system as in claim 7, said system further comprising a plurality of variable bit rate channels, said control circuit providing a second control signal corresponding to one of said variable bit rate channels, when accessing an entry in said transmission table not corresponding to any one of said constant bit rate channels, wherein said transmission circuit receives said second control signal and transmits a data packet corresponding to said one of said plurality of variable bit rate channels.

9. A system as in claim 8, said system further ordering said variable bit rate channels in accordance with a predetermined priority, said control circuit selects said one of said variable bit rate channels in order of said predetermined priority.

10. A system as in claim 1, wherein said transmission circuit provides, upon completing transmission of a data packet, a second control signal to said control circuit, said second control signal indicating to said control circuit said data packet is transmitted.

11. A method for managing multiple constant bit rate channels for transmitting data packets, comprising the steps of:

maintaining in a memory circuit a transmission table having a plurality of entries, each entry representing an opportunity for transmitting a data packet;

creating, for each of said multiple constant bit rate channels, a number of corresponding entries in said transmission table proportional to the bit rate of said channel;

accessing in sequential order said entries of said transmission table whenever a data packet is sent;

for each entry accessed, sending a control signal indicating that a data packet of the channel to which said entry corresponds is to be transmitted; and transmitting said data packet.

12. A method as in claim 11, wherein said entry in said transmission table includes an address of said memory circuit corresponding to a memory location at which said data packet is stored.

13. A method as in claim 11, wherein said creating step creates said entries in said transmission table in response to a command from a host computer interfaced to said system over an industry standard bus.

14. A method as in claim 11, wherein said data packet is an ATM cell.

15. A method as in claim 11, wherein said step of transmitting said data packet transmits said data packet over a fibre optics communication system.

16. A method as in claim 11, further comprising the steps of:
   initializing a counter to a predetermined value;
   creating in said transmission table a plurality of special entries;
   when a transmission of any of said data packets is delayed by the transmission time of a data packet, incrementing said counter by one; and
   when said control circuit accesses one of said special entries, while said counter is greater than said predetermined value, immediately accessing a next entry in said transmission table and decrementing said counter by one.

17. A method as in claim 16, further comprising the step of, when said control circuit accesses one of said special entries and said counter is at said predetermined value, sending a data packet filled with zeroes.

18. A method as in claim 17, said method further comprising the steps of:
   providing a plurality of variable bit rate channels;
   providing a second control signal corresponding to one of said variable bit rate channels, when accessing an entry in said transmission table not corresponding to any one of said constant bit rate channels; and
   transmitting a data packet corresponding to said one of said plurality of variable bit rate channels.

19. A method in claim 18, said method further comprising the steps of:
   ordering said variable bit rate channels in accordance with a predetermined priority; and
   selecting said one of said variable bit rate channels in order of said predetermined priority.

20. A method as in claim 11, further comprising the step of providing a second control signal to indicate complete transmission of a data packet.

21. A system for segmenting a data message into packets of a predetermined size for transmission in a computer network, comprising:
   a host computer coupled to a host memory system, said host computer running a control program, said control program creating a buffer in said host memory system to contain said data message and providing an address with which to access said buffer; and
   a transmission circuit coupled to said host computer to receive said address, said transmission circuit retrieving said data message using said address from said buffer in said host memory system a portion at a time, said portion being smaller than said predetermined size, and transmitting into said computer network each of said portions in a data packet of said predetermined size.

22. A system as in claim 21, wherein said host computer, said host memory, and said transmission circuit are coupled by a bus, wherein said transmission circuit accesses said host memory via direct memory access.

23. A system as in claim 21, wherein said control program provides said address to said buffer in a control message, said transmission circuit comprises:
   a data queue coupled to said bus, said data queue receiving said control message from said control program;
   a status queue coupled to said bus, said status queue being accessible by said control program to retrieve a status message; and
   a logic circuit retrieving said control message from said data queue, said logic circuit (i) retrieving from said control message received said address to said buffer; (ii) accessing said buffer in said host memory said portions of said data message; (iii) transmitting into said computer network said portions of said data message in said data packets; and (iv) providing said status message for retrieval by said control program, said status message indicating complete transmission of said data message.

24. A system as in claim 23, wherein said control program provides a second control message to be received by said data queue, said logic circuit, upon receiving said second control message, provides a second status message in said status queue for retrieval by said control program.

25. A system as in claim 24, wherein said second control message includes a control word created by said control program which is copied by said logic circuit into said second status message.

26. A method for segmenting a data message into packets of a predetermined size for transmission in a computer network, comprising the steps of:
   creating a buffer in a host memory system to contain said data message and providing an address with which to access said buffer;
   receiving said address and retrieving said data message using said address from said buffer in said host memory system a portion at a time, said portion being smaller than said predetermined size; and
   transmitting into said computer network each of said portions in a data packet of said predetermined size.

27. A method as in claim 26, wherein said address to said buffer being provided in a control message sent to a data queue, said step of transmitting comprises the steps of:
   retrieving said control message from said data queue;
   retrieving from said control message received said address to said buffer;
   accessing said buffer in said host memory said portions of said data message;
   transmitting into said computer network said portions of said data message in said data packets; and
   providing a status message in a status for retrieval, said status message indicating complete transmission of said data message.

28. A method as in claim 27, further comprising the steps of:
   providing a second control message in said data queue; and
   upon receiving said second control message, providing a second status message in said status queue for retrieval.

29. A method as in claim 28, wherein said step of providing a second control message includes in said control message a control word, and wherein said step of providing a second status message copies said control word into said second status message.

* * * * *